Sept. 30, 1969   W. A. STUTSKE ETAL   3,469,672
VIBRATORY GROUPING APPARATUS
Filed Sept. 27, 1967   2 Sheets-Sheet 2
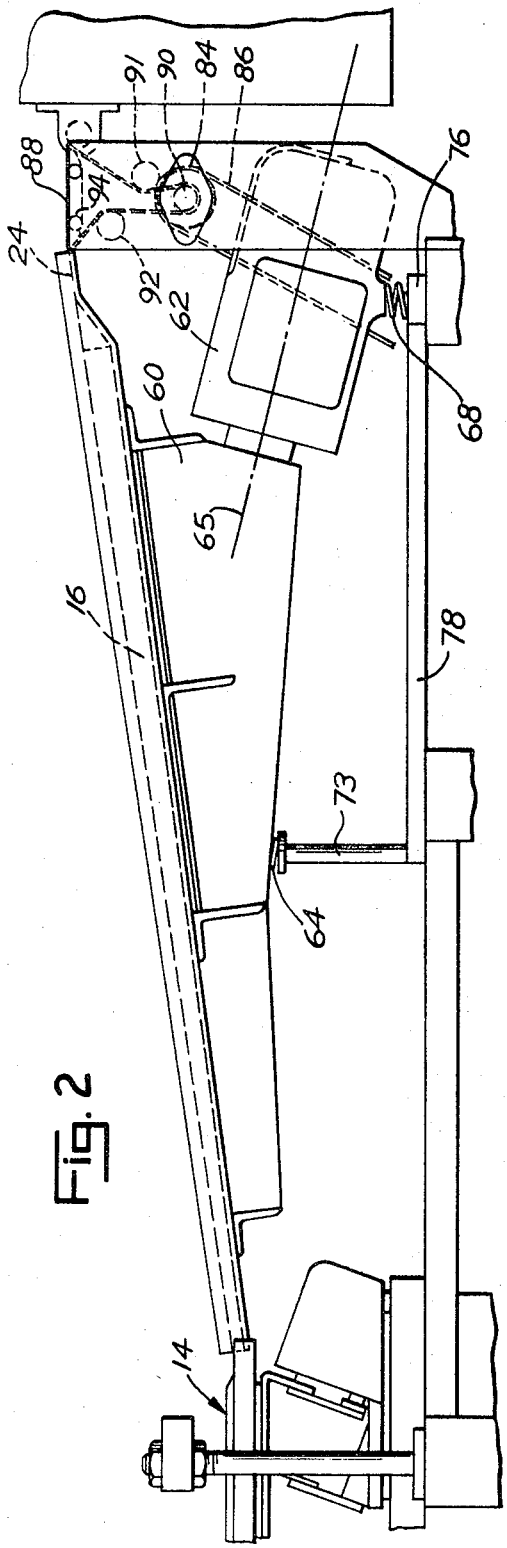
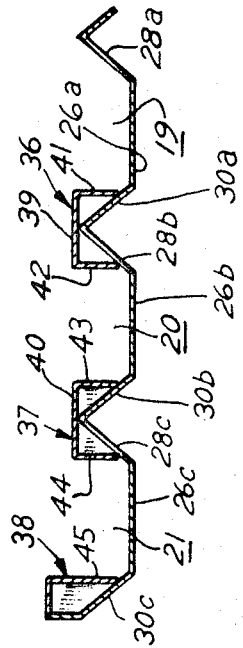
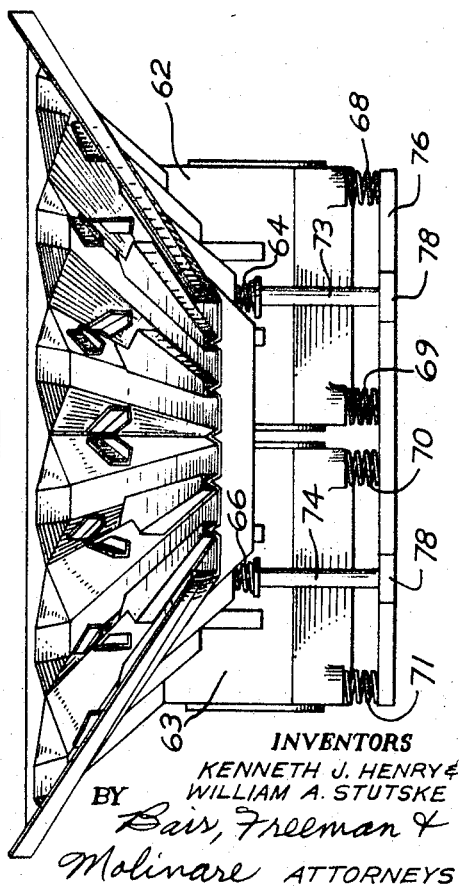
INVENTORS
KENNETH J. HENRY &
WILLIAM A. STUTSKE
BY Bair, Freeman &
Molinare ATTORNEYS

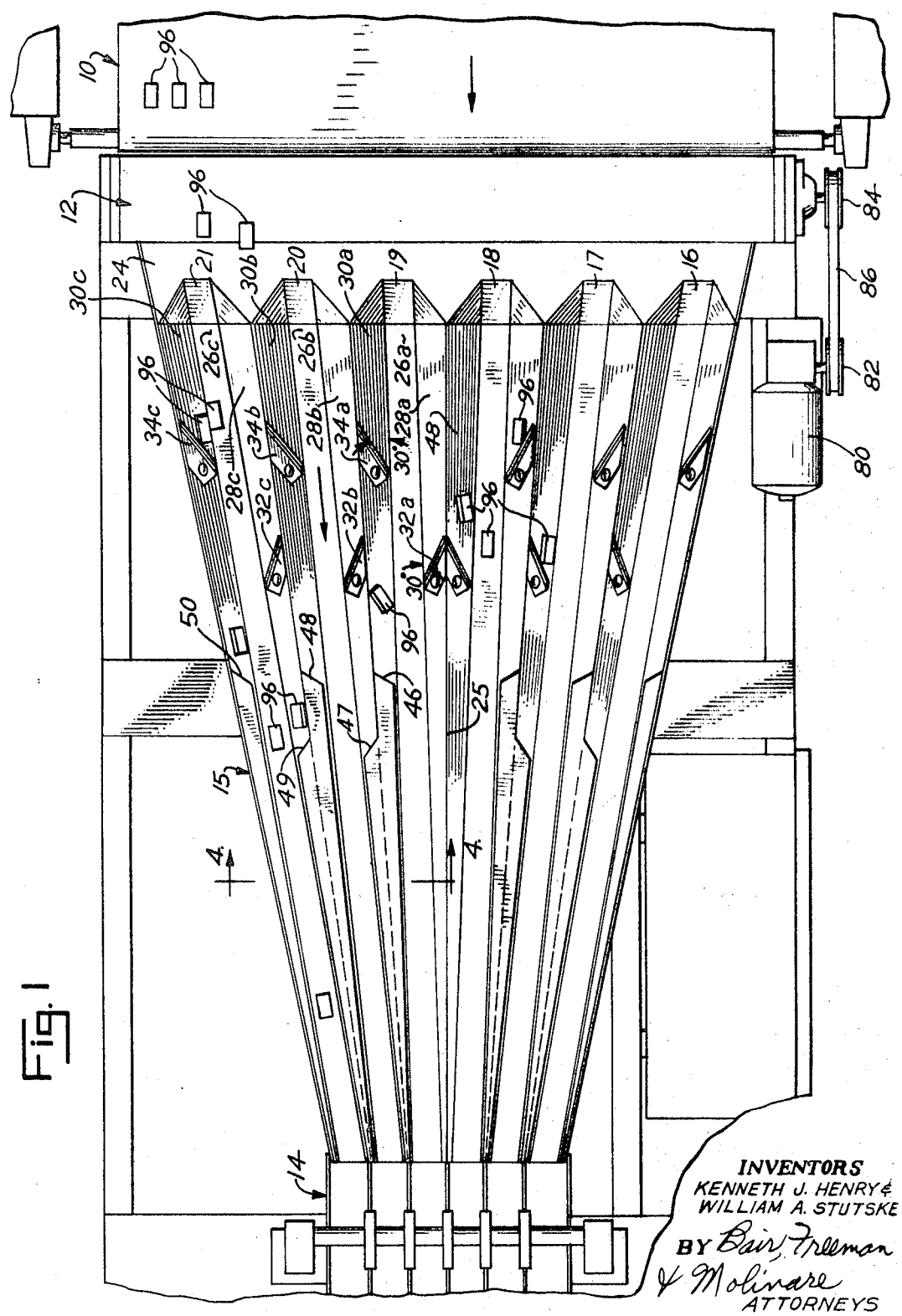

United States Patent Office 3,469,672
Patented Sept. 30, 1969

3,469,672
VIBRATORY GROUPING APPARATUS
William A. Stutske, Toledo, Ohio, and Kenneth J. Henry, Anderson, Ind., assignors, by mesne assignments, to Lynch Corporation, Anderson, Ind., a corporation of Indiana
Filed Sept. 27, 1967, Ser. No. 670,907
Int. Cl. B65g 47/24
U.S. Cl. 198—30                               9 Claims

ABSTRACT OF THE DISCLOSURE

A vibratory grouping apparatus which receives, for example, eighteen rows of articles from a belt conveyor, columnates those articles, reduces the eighteen rows into six and discharges them in single file columns. The apparatus includes six troughs arranged in a side-by-side, fan-shaped array. Each trough is formed from a single planar bottom surface and two side surfaces. Each trough is inclined downwardly in the direction of article travel, and vane blades are attached to the side surfaces to divert articles onto the main planar surface. A vibratory motor vibrates the troughs to cause the rows of articles to move along the length of the troughs to be reduced in number, form single file columns and ultimately be discharged therefrom.

BACKGROUND OF THE INVENTION

This invention relates to a vibratory grouping apparatus adapted to receive a plurality of randomly arranged articles to columnate and to discharge those articles in an ordered fashion.

During the preparation of prepared foods which are ultimately to be packaged for the consumer, the prepared foods may traverse their production route on conveyor belts or similar continuous production apparatus. While on the conveyor belt the articles may tend to become randomly oriented and disbursed. Thus prior to packaging it is necessary to arrange the products or articles in an ordered fashion in preparation for the packaging machines. It is therefore desirable to include at the end of the production line an apparatus which will arrange the articles in a desired order and reduce a multiple of rows into a single file column. Such an apparatus should include a minimum number of moving parts, be of economical construction and operation, and provide a rapid means of arranging the articles in ordered fashion.

SUMMARY OF THE INVENTION

In a principal aspect the present invention comprises a vibratory grouping apparatus adapted to receive a plurality of randomly oriented and disbursed articles, to columnate and order those articles and to discharge them in a single file column. The apparatus is comprised of a plurality of troughs adapted to receive the articles. The troughs are arranged side-by-side in a fan-shaped array with articles being received at the broad top part of the array to be guided down the troughs toward the narrow end of the array. The array of troughs is tilted downwardly from the top receiving part. Each trough includes guide means to divert the articles into a single column within each trough. The columnated articles are subsequently discharged at the lower or narrow end of the trough array.

It is thus an object of the present invention to provide an improved vibratory grouping apparatus.

It is a further object of the present invention to provide a grouping apparatus with a minimum of moving parts.

One other object of the present invention is to provide a grouping apparatus with a simple and economical construction.

It is a further object of the present invention to provide a grouping apparatus which may be easily incorporated with existing production line facilities to arrange articles from processing lines in an acceptable manner for automatic packaging equipment.

These and other objects, advantages and features of the present invention will be more fully set forth in the detailed description which follows.

BRIEF DESCRIPTION OF THE DRAWINGS

In the detailed description which follows reference will be made to the following drawings in which:

FIGURE 1 is a top plan view of the vibratory grouping apparatus in combination with article feeding means and article takeoff means;

FIGURE 2 is a side view of the apparatus illustrated in FIG. 1;

FIGURE 3 is an end view of the troughs looking from the lower inclined end of the troughs toward the upper end; and FIGURE 4 is a cross sectional view of the lower end portion of the troughs of the apparatus taken substantially along the line 4—4 of FIG. 1.

DESCRIPTION OF THE PREFERRED EMBODIMENT

In FIGS. 1 and 2 the vibratory grouping apparatus is illustrated in combination with a continuous food processing unit 10, a conveyor delivery system 12 and an article pickup system 14. In operation the conveyor delivery system 12 continuously delivers articles, such as candy bars, from the continuous food processing unit 10 to a leading edge portion 24 of a trough section 15. The articles then pass into one of six separate troughs 16 through 21 where they are columnated and finally guided onto the article pickup system 12.

As illustrated in FIGS. 1 and 2 the conveyor delivery system 12 includes a belt drive motor 80 connected by means of pulleys 82 and 84 and a belt 86 to an endless conveyor belt 88. The conveyor belt 88 is guided by pulleys 90 through 92 and a shoe 94. The conveyor belt 88 is driven in the direction indicated by the arrow to discharge articles onto the leading edge portion 24 of the trough section 15. The belt 88 is elevated slightly above the leading edge portion 24 to facilitate article transferral onto the leading edge portion 24.

Once the articles are positioned on the leading edge portion 24, the trough section 15 vibrates causing the articles to fall into the troughs 16 through 21. The articles, for example as at 96 in FIG. 1, are thus caused to be engaged by and diverted by the vane and vane guide members, as will be more fully described below, onto the bottom surface of each trough. The articles then travel down the six downwardly inclined troughs in single file toward the article pickup system 14. Preferably the trough section 14 is inclined downwardly from the conveyor belt 88 in the direction of article travel at approximately 10° from the horizontal.

In the presently described embodiment the six troughs 16 through 21 are arranged in a side-by-side, fan-shaped array. The broad or top part of the array terminates with the leading edge portion 24. The bottom or narrow part of the array terminates to discharge articles onto the pickup system 14. Preferably the array of troughs is fashioned from a stainless steel plate material which is bent and shaped into the desired configuration. A single sheet of material may thus serve to fabricate a number of troughs arranged as illustrated in FIG. 1. The vane blades and vane members, described below, are also fashioned from stainless steel to facilitate cleaning and promote sanitary standards of the equipment.

In describing the construction of the troughs 16 through 21 the description will be directed especially to the troughs 19, 20 and 21. Troughs 16, 17 and 18 are similarly constructed and are the mirror image of troughs 19, 20 and 21 on the opposite sides of a centerline axis 25.

The troughs 19, 20 and 21 include first planar or bottom surfaces 26a, 26b, and 26c, respectively. The bottom surfaces 26a, 26b, 26c are inclined downwardly from the delivery conveyor system 12 and leading edge portion 24 toward the article pickup system 14. Extending up from each side of the bottom surfaces 26a, 26b and 26c are second planar or side surfaces 28a, 28b and 28c and third planar or side surfaces 30a, 30b, 30c. The second side surfaces 28a, 28b, 28c and third side surfaces 30a, 30b, 30c are trapezoidally shaped with the longer base of the trapezoid adjacent the delivery end of the trough section 15 and the narrow base end adjacent the article pickup end of the fan shaped trough section 15. The bottom surfaces 26a, 26b and 26c have a substantially constant width along their entire length.

Extending at a right angle from the side surfaces 28a, 28b, 28c are vane blades 32a, 32b, 32c, respectively. Similarly vane blades 34a, 34b, 34c are attached to side surfaces 30a, 30b, 30c, respectively. As illustrated for trough 19 in FIG. 1, vane blades 32a and 34a, which extend at right angles from the side surfaces 28a and 30a respectively, are inclined at approximately 30° to the direction of article travel. The remaining vane blades 32b, 32c, 34b, 34c are similarly positioned in troughs 20 and 21 respectively to divert an article from a line of travel on the side surfaces 28b, 28c, 30b, 30c onto the bottom surfaces 26b, 26c.

Articles which are delivered from the conveyor belt 88 to the trough section 15 have a tendency to continue in a straight path along the trough section 15. For this reason, vane blades 32a, 32b, 32c are downslope from vane blades 34a, 34b, 34c. Thus all of the articles, which have a tendency to travel a straight line, are initially diverted toward the centerline axis 25. The positioning of the vane blades thereby more effectively guides articles from the broad of the fan shaped trough section 15 toward the narrow lower end of the trough section 15.

Referring now to FIGS. 1, 3 and 4, vane guide members 36, 37 and 38 are illustrated at the lower end of the trough section 15. Vane guide members 36 and 37 include a top surface 39 and 40 respectively and two guide surfaces 41, 42 and 43, 44, respectively. Vane guide member 38 includes a guide surface 45. Guide surface 41 is perpendicular to the bottom surface 26a of trough 19 and runs parallel to the intersection of side surface 30a and bottom surface 26a. Similarly for trough 20, guide surfaces 42 and 43 are perpendicular to bottom surface 26b and run parallel with the intersection of the bottom surface 26b with the side surfaces 28b and 30b. Guide surfaces 44 and 45 are likewise arranged for trough 21. Each guide surface 41 through 45 is welded to its respective side surface 30a, 28b, 30b, 28c, 30c substantially at the intersection of the respective side surface with the bottom surface 26a, 26b and 26c. The guide surfaces 41 through 45 thus define channels in each trough 19, 20, 21 which are wide enough to accept only one article 96. Thus the guide surfaces 41 through 45 provide a means for insuring single file discharge of articles from each trough 19, 20, 21.

Also included with vane guide member 36 are diverting surfaces 46 and 47 as shown in FIG. 1. Similar diverting surfaces 48 and 49 are provided with vane guide member 37. Diverting surface 50 is included with vane guide member 38. Each diverting surface 46 through 50 extends at a substantially right angle from its respective adjacent side surface 30a, 28b, 30b, 28c, 30c. In addition, the diverting surfaces 46 through 50 are inclined to the direction of article travel in the same manner as the vane blades previously described. For example diverting surface 46 extends at a right angle from side surface 30a and is inclined at about 30° to the direction of article travel to thereby divert the articles 96 onto bottom surface 26a.

Preferably, the diverting surfaces 46 through 50 are tilted slightly from the perpendicular so that the top part of the diverting surface is slightly upstream from the bottom part. By this construction articles are more easily guided onto the bottom surfaces 26a, 26b, 26c.

The diverting surfaces 46 through 51 are also staggered as were the vane blades 32a, 32b, 32c, 34a, 34b, 34c. Thus diverting surfaces 46, 48 and 50 of troughs 19, 20 and 21 respectively are situated upstream from diverting surfaces 47 and 49. This arrangement, as with the vane blades previously described, counteracts most effectively the tendency of the articles to travel in a straight line rather than toward the axis 25 along a bottom surface of one of the troughs. It has been found that since bottom surface 26a provides a nearly straight line path from the delivery system 12 to the pickup system 14, no diverting or guide walls are required on side surface 28a.

FIG. 2 illustrates the support construction of the vibratory apparatus. The vibratory apparatus is generally comprised of a main support section 60, which is directly and rigidly connected to the trough section 15. Drive units 62 and 63 mechanically drive the entire apparatus back and forth along an axis 65 at a desired frequency of vibration. The vibrator drive units arranged in this manner cause the articles on the trough section 15 to jump forward and upward. The frequency of vibration, the amplitude of vibration and the angular relationship between the axis 65 and the trough section 15 may be varied to control the speed of articles in the trough section 15. Drive units or drivers 62 and 63 of the type utilized in the vibratory driving apparatus of the present invention are manufactured and sold by Syntron Company, Homer City, Pa., cat. #F–212.

Referring now to FIGS. 2 and 3 the support section 60 is supported on coil springs 64 and 66. In a similar manner the drive section comprised of drive units 62 and 63 is supported on springs 68 through 71. Thus the entire trough section 15 and the drive apparatus is completely spring mounted. Springs 64 and 66 are mounted on vertical frame members 73 and 74. Springs 68 through 71 are mounted on a single horizontal frame member 76. The frame members 73, 74 and 76 are appropriately interconnected by cross members 78 and the entire apparatus is fixed on mounting blocks or a mounting frame (not fully illustrated) at the appropriate position in the food or other processing line.

In operation, eighteen rows of candy bars, for example at 96, are delivered from the food processing unit 10 to the conveyor delivery system 12. The conveyor delivery system 12 then carries the eighteen rows of candy bars 96 onto the leading edge portion 24 of the trough section 15. There, because of the inclination and vibration of the trough section 15, the bars 96 divide into six substantially equal groups of candy bars 96, one group in each trough 16 through 21. Thus one important function of the apparatus is to reduce the number of rows of articles from the large number fed onto the apparatus down to a number of rows equal to the number of troughs making up the apparatus. The reduction may be affected whether the articles fed onto the apparatus are randomly oriented or in uniform rows.

The bars then travel downward along the trough as in trough 21. The candy bars 96 are first diverted by the vane blades, as at 34c in trough 21, onto the bottom surface 26c. If two bars are side by side, one may be forced at least partially up the side surface 28c. Vane blade 32c however diverts the bar 96 back onto the bottom surface 26c. Diverting walls 49 and 50 function in a similar manner. However, once a bar passes lower diverting wall 49, it is squarely positioned within a walled channel and cannot climb side surfaces 28c or 30c. Thus though diverting wall 50 may force a candy bar partially upon side surface 28c, the bar will be forced to enter the channel defined by bottom surface 26c and guide surfaces 44 and 45. Guide surface 45 prevents the candy bar from climbing side surface 30c.

In a similar manner all of the candy bars are columnated in each trough 16 through 21 and discharged onto the conveyor belt of the pickup system 14.

While the apparatus in this invention has been described in terms of use in a food processing plant, its application is not restricted to such uses. Any assembly line process such as, for example, the manufacture of electronic components may utilize the apparatus of the claimed invention. Therefore it is to be understood that all those embodiments which are obvious to persons skilled in the art and all those embodiments which are equivalent to the claimed invention are to be included within the scope of the claimed invention.

What is claimed is:

1. A vibratory grouping apparatus adapted to receive a plurality of articles, to columnate and then to discharge said articles one at a time comprising, in combination, at least one multisided trough adapted to receive a plurality of said articles, said trough including a first planar bottom surface inclined downwardly and only in the direction of article travel, said bottom surface having a uniform width to accommodate a single one of said articles, said trough also including a second inclined planar side surface and a third inclined planar side surface, said side surfaces being inclined to said bottom planar surface to thereby define said trough, said trough also including a lower portion, means within said trough for directing said articles, said means including vane guide members attached to said second and third side surfaces to guide articles onto said bottom surface, and vibratory means operably connected with said trough to continuously vibrate said trough and articles thereon and thereby columnate said articles and move said articles in the direction of descending incline along said bottom surface, said articles being subsequently discharged one at a time.

2. The apparatus of claim 1 wherein said vane means also include vane blades attached to said second and third side surface to engage and divert articles from said side surfaces onto said bottom surface, said vane blades on one of said side surfaces more nearly adjacent said lower portion than said vane blades on the other of said side surfaces.

3. The apparatus of claim 1 wherein said vane guide members include a diverting wall and a guiding wall, said guide members extending along the lower portion of said trough with said diverting wall inclined in the direction of article travel and attached to one of said surfaces adjacent said bottom surface to divert and guide articles onto said bottom surface and said guiding wall attached to said trough substantially at the intersection of said adjacent surface with said bottom surface, said guiding wall being substantially perpendicular to said bottom surface.

4. The apparatus of claim 3 wherein the diverting wall on one of said side surfaces is more nearly adjacent the discharge end of said trough than the diverting wall on the other of said side surfaces.

5. The apparatus of claim 1 wherein said bottom surface is inclined at approximately 10° from horizontal, downwardly in the direction of article travel.

6. The apparatus of claim 1 in combination with external feed means at the article receiving end of said trough, said feed means to provide articles to said apparatus, and takeoff receiving means at the opposite end of said trough for receiving said articles singly from said trough.

7. The apparatus of claim 1 wherein said vibrator means include vibrator motor means drivingly connected to said trough, said motor means and trough combination being spring mounted on a frame to permit free vibration of said apparatus to allow travel of said articles through said trough.

8. The apparatus of claim 1 wherein said vibrator means includes motor means adapted to vibrate said apparatus at adjustable frequencies, adjustable amplitudes and in adjustable directions.

9. The apparatus of claim 1 including a plurality of troughs arranged side-by-side in a fan-like array, said fan-like array having a broad and narrow end, said broad end adapted to receive articles to be columnated, said articles subsequently being discharged from said narrow end.

References Cited

UNITED STATES PATENTS

| 1,220,801 | 3/1917  | Varga    | 198—33 X |
| 1,870,201 | 8/1932  | Dietmann | 198—30   |
| 2,612,985 | 10/1952 | Crosland | 198—30 X |
| 2,832,459 | 4/1958  | Lauer    | 198—33   |

FOREIGN PATENTS 415,844    7/1925    Germany.

EDWARD A. SROKA, Primary Examiner

U.S. Cl. X.R.

198—33